(12) United States Patent  
Coon

(10) Patent No.: US 6,499,912 B2
(45) Date of Patent: Dec. 31, 2002

(54) TOOL FOR REPLACEMENT OF UNDERGROUND PLASTIC PIPE

(75) Inventor: Darren L. Coon, 14747 Darby Creek Rd., Orient, OH (US) 43146

(73) Assignee: Darren L. Coon, Orient, OH (US)

( * ) Notice: Subject to any disclaimer, the term of this patent is extended or adjusted under 35 U.S.C. 154(b) by 0 days.

(21) Appl. No.: 09/745,311

(22) Filed: Dec. 21, 2000

(65) Prior Publication Data

US 2002/0081156 A1 Jun. 27, 2002

(51) Int. Cl.[7] ................................. F16L 55/18
(52) U.S. Cl. .................... 405/184.3; 405/184; 405/156; 138/97
(58) Field of Search .......................... 405/184.3, 184.2, 405/184.1, 184, 156, 154.1; 138/97

(56) References Cited

U.S. PATENT DOCUMENTS

| | | | |
|---|---|---|---|
| 4,505,302 A | 3/1985 | Streatfield et al. | 138/97 |
| 4,732,222 A | 3/1988 | Schmidt | 175/22 |
| 4,903,406 A | 2/1990 | Schosek et al. | 30/92.5 |
| 5,306,101 A | 4/1994 | Rockower et al. | 405/184 |
| 5,544,977 A | 8/1996 | Cravy et al. | 405/154 |

Primary Examiner—Frederick L. Lagman

(57) ABSTRACT

A tool for replacing existing plastic water service pipes that are buried underground. The proposed tool is pulled through an existing pipe by a stranded steel cable. The internal wall of the pipe is scored by a single cutting blade incorporated into the tool. The pipe is split open along the scoring as a result of the outward pressure created by a rearward portion of the conically shaped tool which is larger in diameter than the inside of the existing pipe. A replacement pipe is attached to the end of the tool and simultaneously pulled into place. The short tapered shape of the tool allows it to be pulled through bends encountered in the existing plastic pipe.

3 Claims, 4 Drawing Sheets

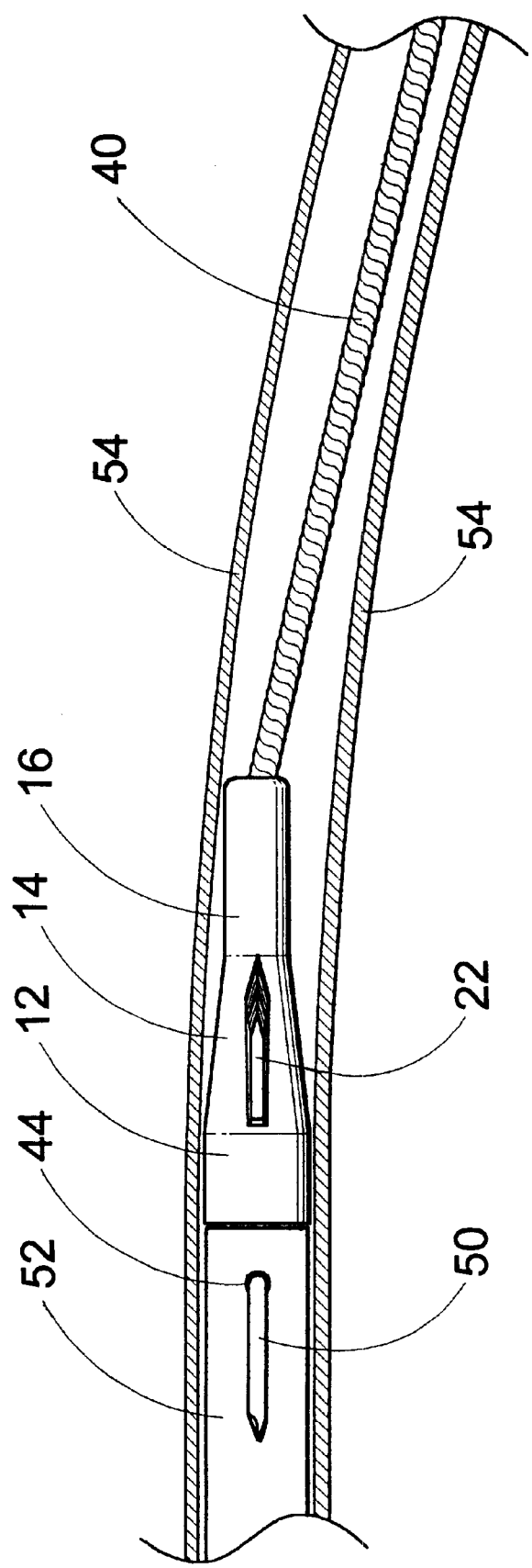

TOOL FOR REPLACEMENT OF UNDERGROUND PLASTIC PIPE

FIELD OF INVENTION

This invention relates to a tool for the replacement of underground plastic pipe, such as water service lines and the like, whereas the existing pipe is split and expanded, while a replacement pipe is simultaneously pulled into said pipe.

BACKGROUND OF INVENTION

Many underground plastic pipes, particularly those running from a water main into a residence, have degraded since original installation. As a result of this degradation, these pipes have begun to leak, and require replacement. Typically, a trench is excavated along the full length of the pipe, and a new pipe is installed in the trench, thereby bypassing the original pipe. The excavation can be a long and tedious process, damaging lawns and landscaping. It also risks the possibility of severing cables or other underground utilities.

A number of apparatuses have been developed for the replacement of underground pipe that is made from cast iron, steel, lead, and plastic. In the case of replacement of brittle or fracturable cast iron gas or water mains, a process of bursting the pipe can be used through the application of pressure to the interior walls, as illustrated by U.S. Pat. No. 4,505,302 (Streatfield et al) U.S. Pat. No. 4,732,222 (Schmidt) and U.S. Pat. No. 5,302,053 (Moriarty). Steel pipes can be split using a cutting wheel, then spread apart to allow a replacement pipe to be pulled into place, as illustrated by U.S Pat. No. 4,903,406 (Schosek et al) U.S. Pat. No. 5,306,101 (Rockower & Marazzo) and U.S. Pat. No. 5,439,320 (Abrams). Multiple radial blades are proposed in U.S. Pat. No. 5,076,731 (Luksch) and U.S. Pat. No. 5,544,977 (Cravy & McCall) for the splitting of buried steel and plastic pipe respectively.

While experimenting with previous prototypes, the applicant has found that pipe replacement tools with multiple blades greatly increase the amount of pulling force required, particularly while the tool is being pulled through a curved section of pipe. Opposing blades have a tendency to cause the tool to move off center within the pipe. As a result, the tool is forced against one side of the pipe, thereby increasing drag. Multiple cuts also allow greater amounts of grit and debri to accumulate between the split pipe and the replacement pipe. This debri further increases drag.

The apparatus described by U.S. Pat. No. 5,078,546 (Fisk et al) was specifically designed for replacing 4 inch buried steel pipe with plastic pipe. The apparatus includes a cutting wheel, forward of the cutting blade, to initially groove and weaken the pipe along the intended line of cut. In addition to a pulling cable, a pneumatically operated impact ram is described which attaches to the rearward end of the tool. Neither of these attributes are implied in the description of the tool herein proposed.

The apparatus in U.S. Pat. No. 6,092,553 (Hodgson) is also pulled through underground pipe by a cable. It has a single cutting edge for splitting the pipe, and a large cross section at the rear of the tool for the purpose of spreading the pipe, allowing a replacement pipe to be pulled into place simultaneously. Despite its apparent similarities to the proposed patent, the emphasis in U.S. Pat. No. 6,092,553 is placed on the cable used to pull the tool through the underground pipe. This emphasis stems largely from the fact that the particular application of this patent is the replacement of lead pipes carrying water from a main to a residence. The ability to initially thread a pulling cable into a lead pipe is of special concern because a larger cable is needed due to the much greater forces needed to cut lead pipe as compared to plastic pipe. Mineral deposits, which commonly adhere to the walls of older lead pipe, further inhibit ones ability to install a pulling cable.

As can be interpreted from FIG. 6 of U.S. Pat. No. 6,092,553, which is a plan view showing the typical location where the method of invention would be carried out, the intent of the invention is to replace relatively straight sections of buried pipe. This interpretation is reinforced by FIG. 1 which shows that the tool is relatively long and only very gradually tapered. As a result, the pulling of the tool around curved sections of pipe would be considerably inhibited. Because the type of plastic pipe used to bring water into a residence is commonly taken off a coiled reel, the pipe has a tendency to return to its original shape, thereby resulting in a gentle spiral. In addition, the plastic pipe may be intentionally bent to avoid obstructions, or direct it into a residence, or the settling of the surrounding soil may bend the pipe. Such curves in the buried pipe would significantly restrict the advancement of the tool through the under ground plastic pipe.

Another problem encountered in the development of the tool proposed herein was the susceptibility of the cutting blade becoming caught on objects surrounding the buried pipe such as roots or rocks. This problem is not as much of a concern when replacing lead or steel pipes because huge pulling forces and/or impact ramming is required to split the metal or cut through couplings. Such forces are sufficient enough to push aside extraneous obstacles surrounding the pipe. However, it does become a concern when only the greatly reduced forces are applied when replacing plastic pipe. Even a blade that only slightly protrudes through the wall of the plastic pipe can constrain the motion of the tool.

SUMMARY OF INVENTION

It is the object of the applicant's invention to overcome the deficiencies of prior art devices used in the replacement of underground plastic pipe. In particular, the inability of prior art devices to negotiate bends in underground pipe, and their tendency to become caught on objects surrounding the buried pipe.

This invention is a tool that is pulled through an underground plastic pipe, simultaneously cutting it and pulling a replacement pipe into place. A typical application of the tool would be in the replacement of a water line located between a residence or business, and a shutoff valve at the water main. A stranded steel pulling cable is threaded through the buried pipe and then attached to the tool. A section of copper pipe is then attached to the rearward portion of the tool. A force is applied by the cable, thereby pulling it into the underground pipe.

As the tool advances, a cutting blade scores the inside of the pipe. Because the height of the blade is limited, it does not completely penetrate the wall of the plastic pipe, and therefore, the blade does not protrude from the pipe. Consequently, it is much less likely that the blade will become hung up on tree roots or rocks that may surround the buried pipe. The gradual increase in diameter towards the rear of the proposed tool creates pressure on the inside walls of the plastic pipe causing it to split at the point where it was scored by the blade. The splitting and spreading of the buried pipe allows room for the replacement pipe to be pulled into place behind the tool.

The tapered shape of the proposed tool allows it to be pulled around bends in the buried pipe. Any straight edges or excessive tool length, as exemplified in the drawings of U.S. Pat. Nos. 5,078,546 and 6,092,553 will cause these tools to become hung up within a bend on the outside wall of that bend.

BRIEF DESCRIPTION OF DRAWINGS

FIG. 4 demonstrates how the tapered shape and short length of the tool allows it to be pulled through bends in the underground pipe.

DESCRIPTION OF THE PREFERRED EMBODIMENT OF INVENTION

The body of the proposed tool is made of a cast metal. A blade 22 aligned with the axis of the tool projects from the body. In the preferred embodiment, the blade is cast as part of the body with the leading surface 24 being machined to create a sharp cutting edge. Alternatively, a replaceable blade may be used.

Figure 3:
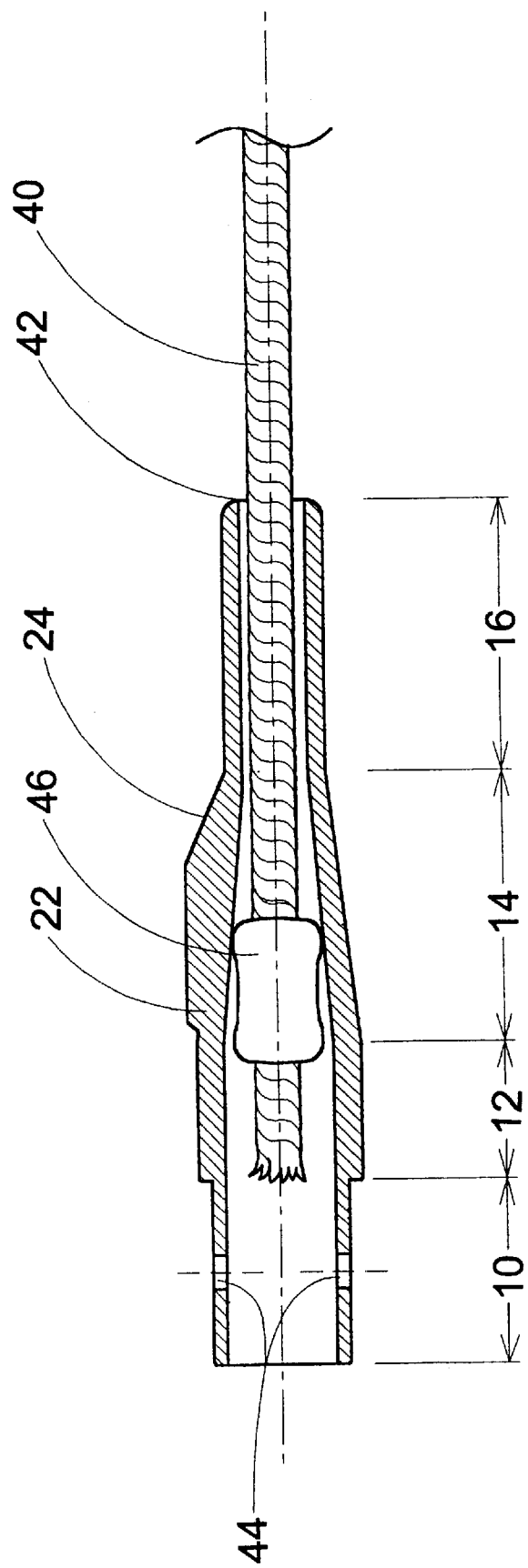
FIG. 3 is a sectional view of the proposed tool showing a pulling cable inserted through an opening in the front of the tool, and a crimp fitting attached to the cable for the purpose retaining the end of the cable within the tool.

Prior to using the tool to replace underground plastic pipe, at for example a residence, an excavation is made at the curb box where the shutoff valve is located. The existing pipe is severed, and a stranded steel cable 40 is fed into the pipe until it exits a severed section of the pipe within the residence or at another excavation. The pulling cable is then inserted into the front extension 16 of the proposed tool, which is hollow, through an opening 42. The cable is then either tied in a knot, folded over on itself, or has a clamp fitting 46 attached as shown in FIG. 3.

Figure 1:
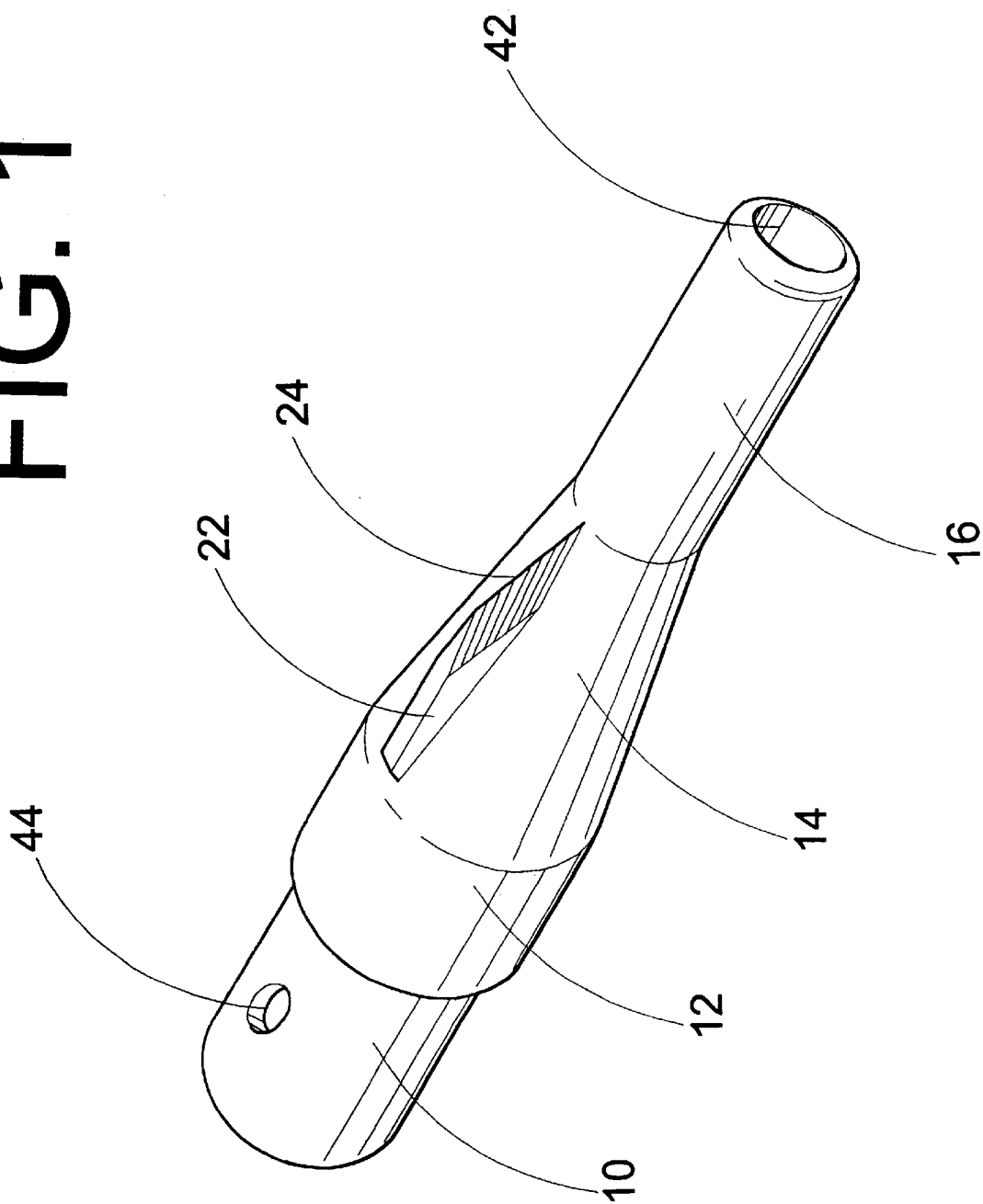
FIG. 1 is a perspective view of a cutting tool with attached pulling cable as embodied by this invention.
Figure 2:
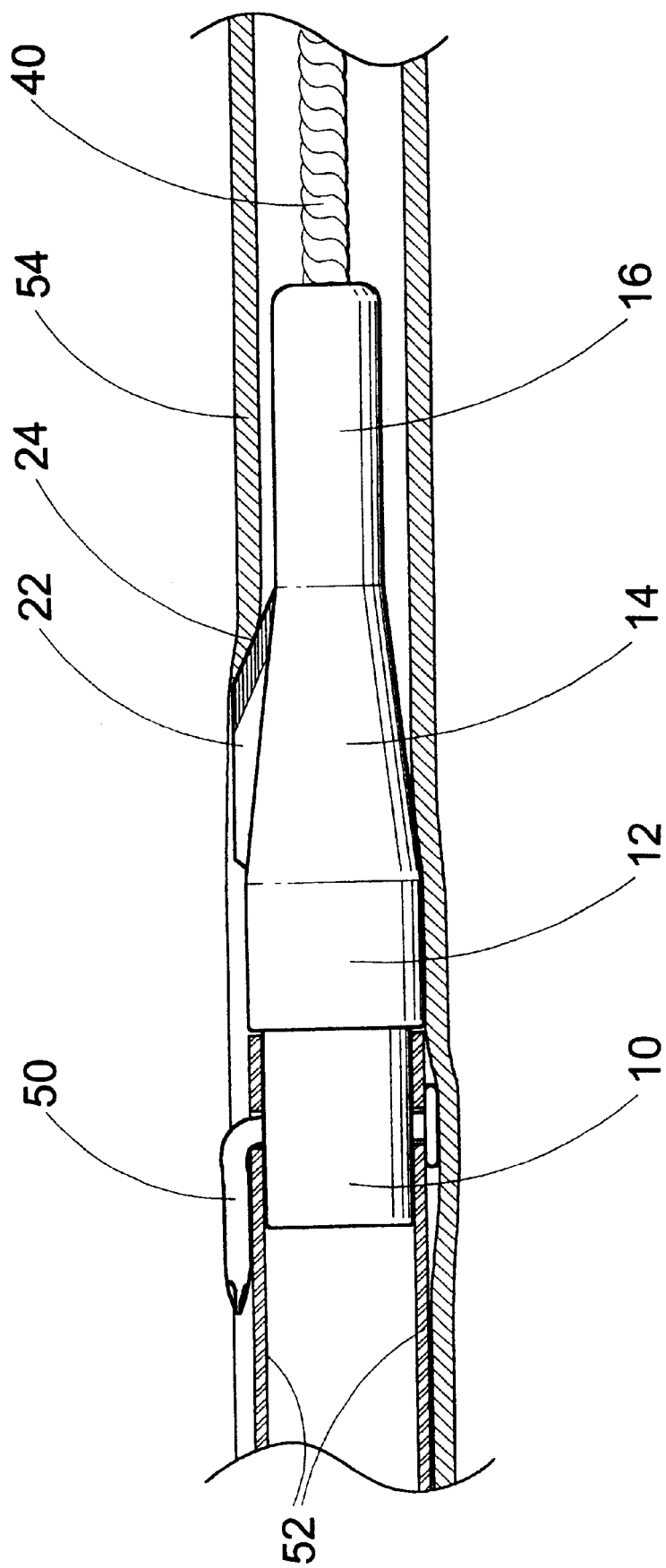
FIG. 2 is a side view of the proposed tool being pulled through and splitting a section of plastic pipe while simultaneously pulling a copper replacement pipe behind it.

The end of a length of copper pipe 52, which is typically coiled on a reel, is fitted over the rear section 10 of the proposed tool. In the preferred embodiment, holes are drilled into the copper pipe prior to the fitting and are aligned with existing holes 44 in the rear section of the tool. Either a pin or a nail 50 is placed through the holes to secure the replacement pipe to the end of the tool as shown in FIG. 2. The upper hole is aligned directly behind the cutting blade 22 in the event a nail is used. The portion of nail 50 protruding from the hole is bent rearward as demonstrated in FIG. 4 such that it will occupy the split in the plastic pipe that is created directly behind the blade.

The tool is pulled into the existing underground pipe 54 by applying tension to the pulling cable 40 at the other end of the pipe. As illustrated in FIG. 2, the cutting edge of the blade 24 scores the interior wall of the plastic pipe 54. Pressure from the blade against the interior wall of the buried pipe causes the crossection of the pipe to become oval or egg shaped. Because the height of the blade is insufficient to completely penetrate the wall of the distorted pipe, there is a reduced possibility that the blade will become hung up on tree roots or rocks that may be surrounding the buried pipe.

As the tool increases in diameter through its center portion 14, further pressure is applied to the interior walls of the plastic pipe, causing it to split where it had been scored by the cutting blade. The rearward section 12 of the tool is only slightly larger than the outside diameter of the replacement copper pipe 52 being pulled behind it. This prevents the leading edge of the copper pipe from catching on the interior wall of the plastic pipe 54. Also, because the maximum diameter of the tool is only slightly larger than the replacement pipe, there is little room for dirt and debri to enter into the slit made in the buried pipe. Such dirt and debri results in drag between surfaces of the existing pipe and the replacement pipe.

FIG. 4 illustrates the characteristics of the tool which allow it to be pulled around bends in the underground pipe 54. As the radius of a bend decreases, a point is reached where the front extension of the tool 16 makes contact with the interior wall of the pipe. The short length and considerable taper of the proposed tool allows it to be more easily pulled through bends. Through experimentation, it has been found that the length of the tool should not exceed seven times the inside diameter of the pipe being replaced. Because the replacement copper pipe 52 is made of a malleable material, it contorts to the shape of the buried plastic pipe as it is being pulled into place.

Upon completion of the pulling of the replacement copper pipe, the pipe is cut to the appropriate length for connection to the shut off valve at the curb box, and for connection within the residence or business.

What is claimed is:

1. A tool for replacing existing underground plastic pipe with a pipe of approximately the same interior diameter, comprising a cylindrical body; a means for attaching a pulling cable a means for attaching a replacement pipe; and a single cutting blade aligned with the axis of the tool, wherein the height of the cutting blade is limited such that it does not completely penetrate the wall of an existing pipe of predetermined thickness.

2. A tool according to claim 1 wherein the maximum diameter of the tool is slightly greater than the outside diameter of the replacement pipe hereto attached.

3. A tool according to claim 1 wherein the cylindrical body of the tool is tapered, and length of the tool is less than seven times the inside diameter of the pipe being replaced.

* * * * *